(12) United States Patent
Hullender et al.

(10) Patent No.: US 7,305,630 B2
(45) Date of Patent: Dec. 4, 2007

(54) INK GESTURES

(75) Inventors: Gregory Hullender, Bellevue, WA (US); Alexander Gounares, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 258 days.

(21) Appl. No.: 11/154,651

(22) Filed: Jun. 17, 2005

(65) Prior Publication Data

US 2005/0229117 A1 Oct. 13, 2005

Related U.S. Application Data

(63) Continuation of application No. 10/068,009, filed on Feb. 8, 2002, now Pat. No. 6,938,222.

(51) Int. Cl.
*G06F 3/00* (2006.01)

(52) U.S. Cl. ...................... 715/863; 345/173

(58) Field of Classification Search .............. 715/764, 715/700, 863; 345/173, 179, 180; 382/215, 382/202, 203, 181, 187, 188, 189
See application file for complete search history.

(56) References Cited

U.S. PATENT DOCUMENTS

| | | | |
|---|---|---|---|
| 5,252,951 A | 10/1993 | Tannenbaum et al. | |
| 5,369,737 A | 11/1994 | Gholizadeh et al. | |
| 5,517,578 A | 5/1996 | Altman et al. | |
| 5,594,640 A | 1/1997 | Capps et al. | |
| 5,625,833 A * | 4/1997 | Levine et al. | 715/500 |
| 5,680,636 A * | 10/1997 | Levine et al. | 715/512 |
| 5,764,797 A * | 6/1998 | Adcock | 382/187 |
| 5,796,406 A | 8/1998 | Shigematsu et al. | |
| 5,920,694 A | 7/1999 | Carlton et al. | |
| 5,986,665 A | 11/1999 | Wrey et al. | |
| 6,049,329 A | 4/2000 | Zetts et al. | |
| 6,256,033 B1 | 7/2001 | Nguyen | |
| 6,269,187 B1 | 7/2001 | Frink et al. | |
| 6,671,405 B1 * | 12/2003 | Savakis et al. | 382/203 |
| 6,771,254 B2 * | 8/2004 | An et al. | 345/173 |
| 6,826,316 B2 | 11/2004 | Luo et al. | |

FOREIGN PATENT DOCUMENTS

EP 0686 931 A2 12/1995

OTHER PUBLICATIONS aha! InkWriter™ The Simplicity of Pen and Paper, The Power of Word Processing., Advertisement, 2 pp., aha! Software corporation, Mountain View, CA, 1983.
aha! InkWriter™ for Magic Cap "The Fastest, Most Convenient Way to Create Faxes, Notes and Messages." Advertisement, 2 pp., aha! Software Corporation, Mountain View, CA, 1993, 1994.

(Continued)

*Primary Examiner*—Kieu D. Vu
(74) *Attorney, Agent, or Firm*—Banner & Witcoff, Ltd.

(57) ABSTRACT

A system and process for capturing and implementing handwritten gestures is described. A user may use gestures to quickly command a pen-based input device to perform operations. Using the described embodiments, users may edit text or handwritten ink using a pen in a pen-based computing platform and have the edits affect the text or ink.

18 Claims, 8 Drawing Sheets

OTHER PUBLICATIONS aha! for Windows InkWriter™ The Power of Word Processing, The Convenience of Pen and Paper, Advertisement, 2 pp., Software Corporation, Mountain View, CA, 1994, 1995.

aha! Software Products, Web page List of Products, pp. 1-5, aha! Software Corporation, Mountain View, CA, Sep. 24, 1997.

Palm III™ Organizer, pp. Ii-viii and 23-32, 1998.

Patent Abstracts of Japan, Publication No. 11327789 for Color Display and Electronic Blackboard System, publication date Nov. 30, 1999.

* cited by examiner

INK GESTURES

CROSS-REFERENCE TO RELATED APPLICATIONS

This application is a continuation of U.S. application Ser. No. 10/068,009, entitled "Ink Gestures," filed Feb. 8, 2002, now U.S. Pat. No. 6,938,222, which is related to U.S. application Ser. No. 09/741,107, entitled "Mode Hinting and Switching," filed Dec. 21, 2000.

FIELD OF THE INVENTION

Aspects of the present invention are directed generally to apparatus and methods for controlling a graphical user interface (GUI). More particularly, the present invention relates to recognizing gestures made by a user using a stylus-based input system and performing functions related to the gestures.

BACKGROUND

Typical computer systems, especially computer systems using graphical user interface (GUI) systems such as Microsoft WINDOWS, are optimized for accepting user input from one or more discrete input devices such as a keyboard and for entering text, and a pointing device such as a mouse with one or more buttons for driving the user interface.

Virtually all software applications designed to run on Microsoft WINDOWS are optimized to accept user input in the same manner. For instance, many applications make extensive use of the right mouse button (a "right click") to display context-sensitive command menus. The user may generate other gestures using the mouse such as by clicking the left button of the mouse (a "left click"), or by clicking the left or right button of the mouse and moving the mouse while the button is depressed (either a "left click drag" or a "right click drag"). See, for example, the right-click-drag mouse commands in Opera 6.0 by Opera Software.

In some environments, a mouse is not usable or desirable. For example, in a digitizer tablet environment, the primary input device may be a stylus. While a stylus attempts to provide pad and paper-like feel to a computing environment, current systems are limited. For example, the use of a stylus in a graphical user interface is limited to tapping on various items for selection. See, for example, the Palm-series of products using the Palm OS 3. x and 4. x operating systems. Also, in these systems, the interaction methodology is cumbersome in that the text entry and commands are input on a dedicated portion of the digitizer, far from the insertion point or selected word or words). Further, in stylus-based input environments, a user is continually forced to select tools or operations from a remote tool bar, generally on a top or bottom of a screen. While a user can type in letters or a digitizer can recognize handwriting, these operations require selecting a keyboard input mode and writing in a predefined portion of the digitizer, respectively. In short, requiring a user to tell the computer, for every new input, what a user wants to do makes stylus-based computing difficult for the average user.

Some operations create new text (for example, writing, typing, pasting text and the like). Other operations modify the text (highlighting, inking, erasing, cutting and moving existing text). A problem with performing the latter modifying operations is that these latter operations are not generally the primary mode of operating for most users. In other words, while a user may modify text, this operation will be secondary to more primary operations of creating new text. Accordingly, the user will eventually need to transition from the modifying text (or other content) operation to the creating text environment. Conventional transitions include toggling a button on a tool bar. Buttons may include an erase button, a highlight button and the like. Toggle buttons, while making it clear for a user on how to select the operating mode and the state of the mode (by whether the toggle buttons are depressed or not), can be cumbersome to use when alternating between various modes in that the user is continuously moving from generally a central portion of a display screen to a remote tool bar (housing the toggle button) juxtaposed to an end of the screen then back again. This repetitive motion and the attention one needs to employ to switch from the auxiliary mode or modes back to the primary mode of operation distracts the user's attention from actively reading or writing to the mundane task of switching between modes.

Previous pen-based computing systems have attempted to address the above problems by permitting a pen action to be interpreted as a command. See, for example, Penpoint by the Go Corporation. However, Penpoint primarily enabled pen-based commands on text.

For handwritten input, Penpoint only permitted the immediate deletion of the previous input by a specified pen movement (here, a right, left, right co-linear movement of the pen tip, also referred to as a flat "z"). Penpoint did not provide the ability to randomly edit handwritten ink anywhere on a page. For pen-based input systems to become part of the mainstream computing environment, support for the freedom of editing handwritten text anywhere on a page needs to occur.

Finally, handwritten ink is not generally compatible with non-ink applications. For example, using an application that requires text input forces users to convert ink to text. In the Palm OS, one needs to place an insertion point, move to a dedicated text input portion at the bottom of the screen, enter the text in the dedicated text input portion, and then return back to the insertion point. These actions quickly become cumbersome and force users away from using legacy applications with a stylus-based input system.

SUMMARY

Aspects of the present invention are directed to a pen-based computing system that allows users to directly write on a display surface solving one or more of the problems identified above. Aspects of the present invention permit users to use gestures to edit displayed information including, but not limited to, handwritten ink and text. Further, in some aspects, gesture-based navigation may be used.

These and other features of the invention will be apparent upon consideration of the following detailed description of preferred embodiments.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION

The following description is separated into the following sections in order to assist the reader: terms, general computing platforms, gestures, recognizing gestures, executing gestures, and data structures.

Terms

The following terms are defined for purposes of understanding the various aspects of the disclosure. Alternative definitions may be known in the art and may supplement these definitions.

Ink—A sequence or set of one or more strokes. A sequence of strokes may include strokes in an ordered form. The sequence may be ordered by the time captured or by where the strokes appear on a page. Other orders are possible. A set of strokes may include sequences of strokes or unordered strokes or any combination thereof. Further, a stroke may include all points comprising the stroke or be limited to only the points signaling a change in direction of the stroke, as well as combinations thereof.

Stroke—A sequence or set of captured points. When rendered, the sequence of points may be connected with lines. The stroke may be represented in a number of ways. For example, the stroke may be represented as a point and one or more vectors in the direction of the next point(s). Further, a stroke may be referred to as a simple list (or array or table) of points and/or vectors. In short, a stroke is intended to encompass any representation of points and/or segments relating to ink, irrespective of the underlying representation of points and/or what connects the points.

Point—Information defining a location in space. The points may be defined relative to, e.g., a capturing space (for example, points on a digitizer) and/or a display space (the points or pixels of a display device). Points may be represented using a variety of known techniques including Cartesian coordinates (X, Y), polar coordinates (r, $\Theta$)), three dimensional coordinates ((X, Y, Z), (r, $\Theta$, p), (X, Y, t (where t is time)), (r, $\Theta$, t)), in four dimensional coordinates ((X, Y, Z, t) and (r, $\Theta$, p, t)), and other techniques as known in the art.

Render—The process of determining how graphics (and/or ink) is to be displayed, whether on a screen, as printed, or output into another file format.

Word—Also referred to as an ink word. A word is one or more strokes. Each stroke in a word has a location associated with the stroke. Words can alternatively be defined as text words or groups of letters that form terms definable in a dictionary. Words can also include punctuation, combinations of letters and numbers and other symbols, and may include compound words.

Flow—One or more words associated with one another in order. For example, each handwritten note jotted down on a page may represent a flow. Adding to each note adds one or more words to the flow containing the words. Each word in a flow has a location in the flow associated with it.

Space—An area with no displayed content. In some instances, when referring to separations between words in a flow, space may be considered as a separate word having no strokes. When referring to a blank area on a page, space may refer to area on the page unclaimed by a flow.

Gesture—A drawing or other ink that may be interpreted as a command.

General Computing Platforms

Figure 1:
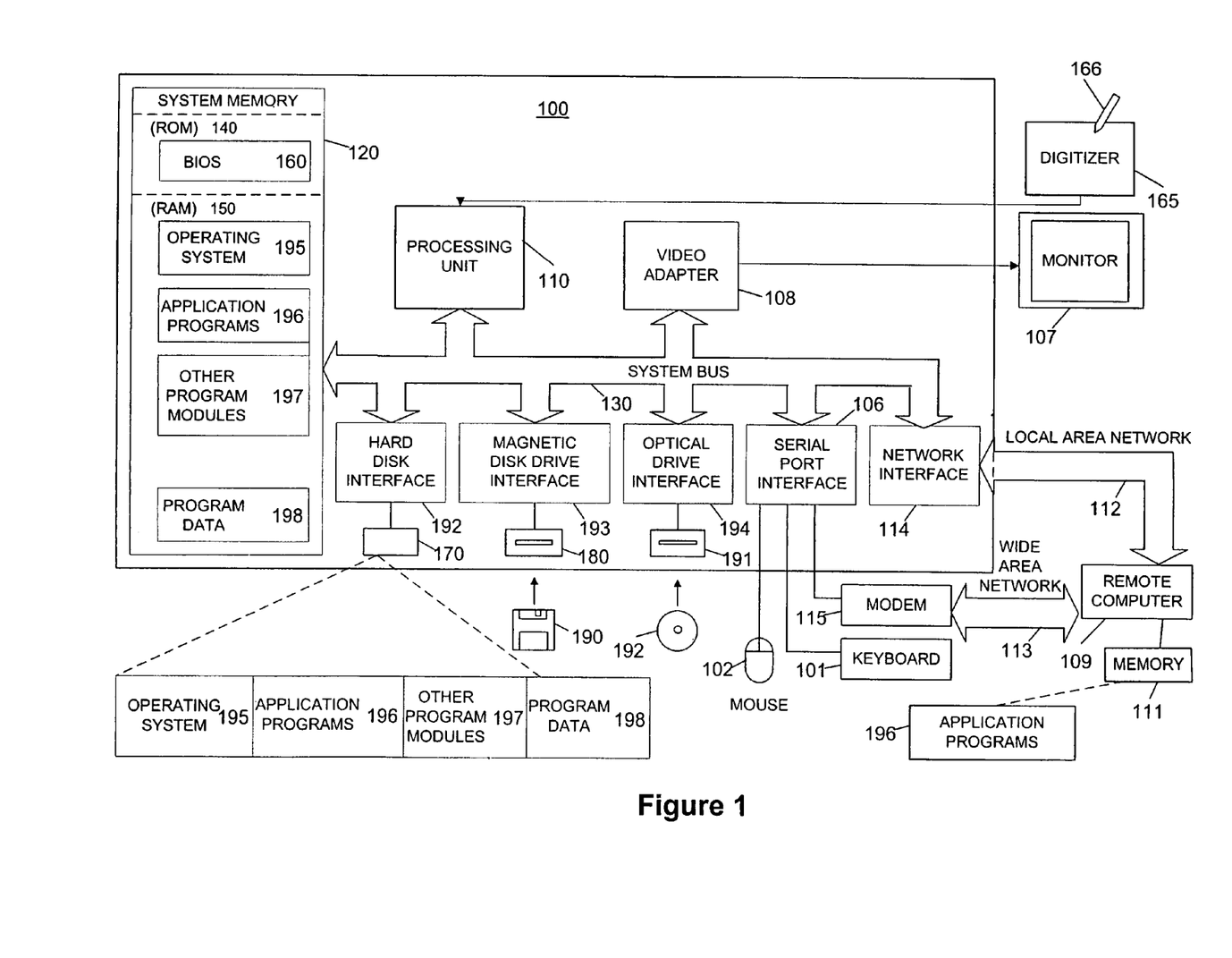
FIG. 1 is a schematic diagram of an exemplary general-purpose digital computing environment that can be used to implement various aspects of the invention.

FIG. 1 illustrates a schematic diagram of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
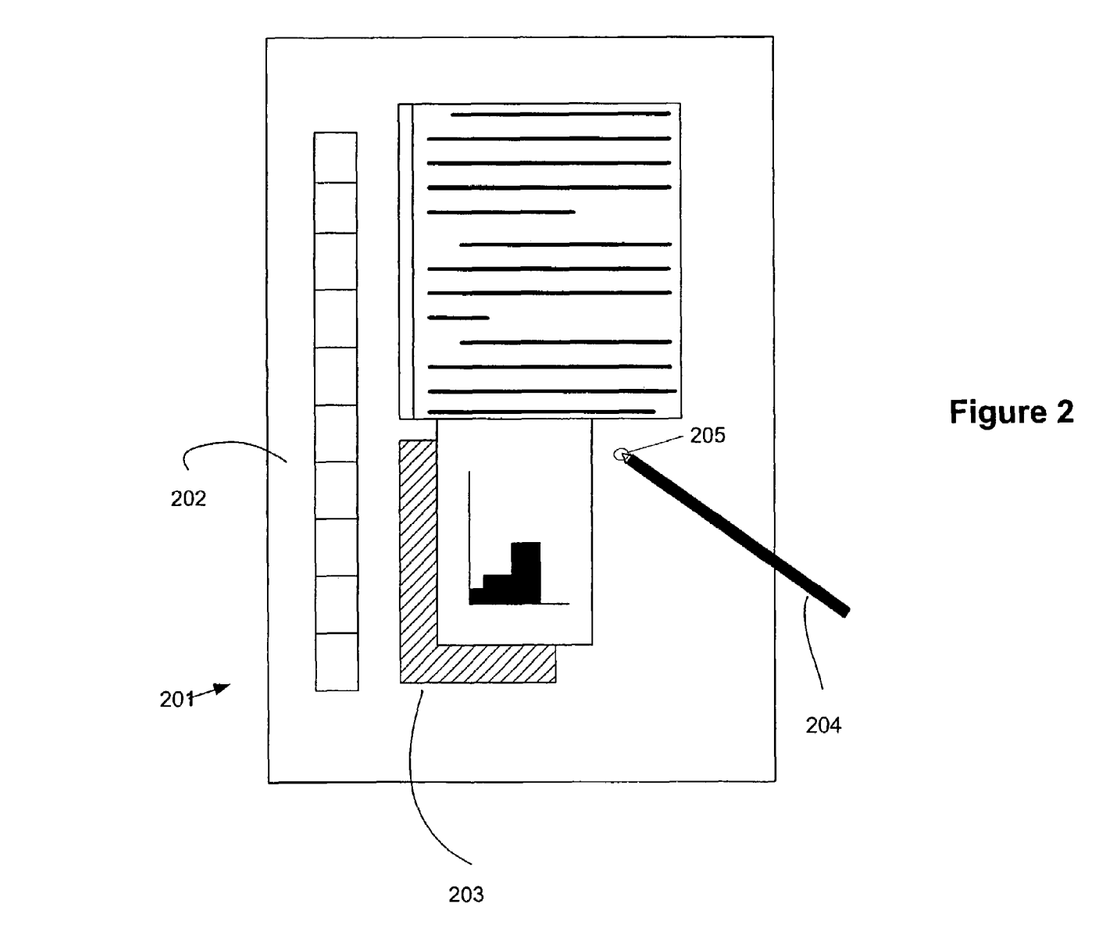
FIG. 2 is a plan view of an exemplary tablet computer and stylus that may be used in accordance with various aspects of the present invention.

FIG. 2 illustrates a stylus-based computer processing system (also referred to as a tablet PC) 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. Tablet PC 201 interprets marks made using stylus 204 in order to manipulate data, enter text, and execute conventional computer application tasks such as spreadsheets, word processing programs, and the like.

A stylus could be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

Region 205 shows a feed back region or contact region permitting the user to determine where the stylus as contacted the digitizer. In another embodiment, the region 205 provides visual feedback when the hold status of the present invention has been reached.

Gestures

Gestures may be generally defined as motions of a stylus that are intended as something more than handwritten ink. When there exist two ways of drawing a particular ink element, and the second way is more complex than the first, it may be preferable that the second way is considered, or assumed to be, a gesture. For example, a single circle where the stylus physically moves about 360 degrees around a point may be considered a drawn circle, the letter "o", or the number zero, whereas a double circle that traces over itself may be considered to be a gesture. Other gestures may be used.

Figure 3:
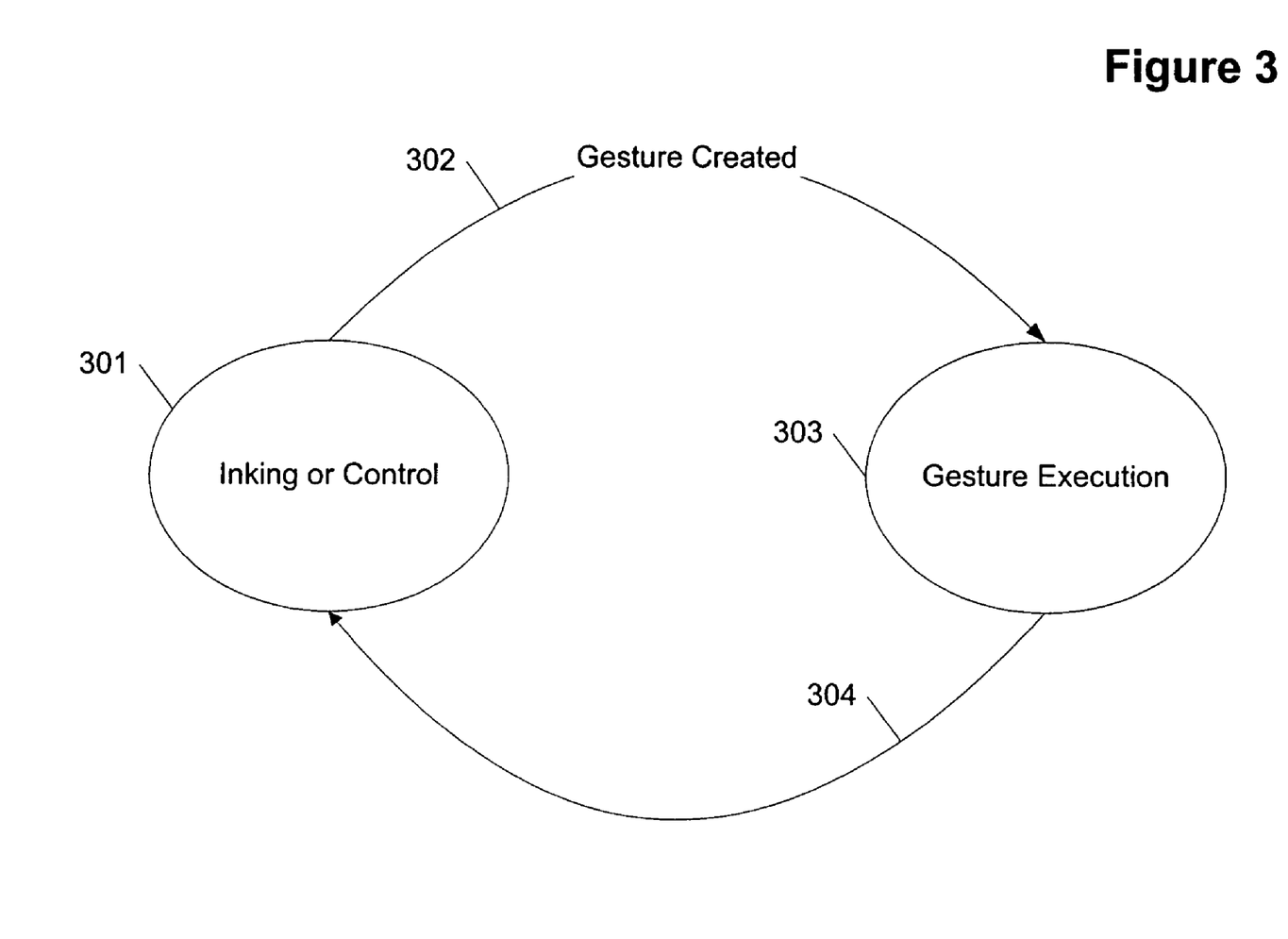
FIG. 3 shows an example of various modes of operation in accordance with embodiments of the present invention.

FIG. 3 shows a process for implementing gestures where the gestures are shown to be accessible from a general operating environment 301. A user may be adding ink or controlling some aspect of a display (e.g., reviewing, scrolling, and the like) in 301. Once a gesture is created (and/or recognized) in 302, it may be executed in 303. After execution, the system is ready to accept more inputs by returning to 301 by path 304.

Alternatively, the execution of the gesture may be held for a later time. In this alternative embodiment, the gesture may be rendered as ink and the gesture executed later. The execution may be done in a present application or may be passed to another application for execution.

Gestures may be used in a variety of locations. Gestures may be made on a display surface. In addition, gestures may be made in the air (some pen-based computing systems use an inductive technology to detect the pen and can know the altitude of the pen).

Gestures can be made on buttons and similar controls (e.g., a check mark for help).

Gestures can be used to edit text and/or ink. Gestures may be made in dedicated input portions of a display (either fixed or temporary).

Gestures may have one or more of the following characteristics: default action or control method or property, action area, position, size/extent, and shape. Other characteristics may be incorporated into this list.

Default Action or Control Method or Property

Each gesture may have one or more default actions associated with it. For example, a tap may have a general select action associated with it. If the tap is preceded by no other taps, the tap may be to select a word. If the tap is preceded by one previous tap, the latter tap may be to select a sentence. If the tap is preceded by two previous taps, the last tap may select the entire paragraph. Similarly, with four taps, the last tap may select all.

In some embodiments, the default action may be referred to as a control method or control property of a gesture. The control method or property of a gesture is what the gesture does or affects when executed. For example, the method or property of a gesture to bold a word or a selection changes the rendering of the word or selection to have a bolder font or representation. In addition, the method or property of a selection gesture is to select something on a displayed page. The page may have ink, drawings, text, pictures, and/or other such items.

Action Area

The action area of a gesture is the area that the gesture is to affect. For example, in the case of a checkmark being a gesture for help on an item or button or part of a user interface, the action area of the checkmark may be a small region surrounding the bend in the checkmark. Accordingly, a user would place the action area of the checkmark on the thing for which the user wanted help.

In an some embodiments, the action area may be compressed from an area to a point or set of points. In the checkmark example above, the point at the intersection of the two lines making the checkmark may be the action area. Such embodiments may provide the ability for a user to be very exact in the placement of each gesture. So, for example, the gesture would relate to a single point. On the other hand, where the action area is a larger region, it may be advantageous in that even if the stylus slightly missed an intended point where the gesture would take effect, the intended gesture may still affect the intended area. For example, if a user attempted to place a check mark on a button, yet slightly missed the button, while most of the check mark was on the button, the larger region approach may still ask for help on that button.

In a further embodiment, the action area may be a bounding box or the start of a bounding box. For example, with a left bracket selection gesture, the top and bottom corners may be the start of a bounding box containing a selection.

The action area of a gesture may be variable and may be based on one or more attributes of the gesture. For example, an X placed on a single word may have an action associated with the gesture to be to delete the word (where the action area for that gesture may be a small region or a single point at the center of the X). Alternatively, a large X over a paragraph may expand the scope of the action area to encompass the entire paragraph. This scaling of action areas may be adjusted by other attributes including, but not limited to, the speed of writing the gesture, the pressure of the stylus on the surface of the digitizer, the angle of the stylus (if sensing of the angle is enabled by the hardware), the location of the gesture on the display screen, the location of the gesture relative to other elements displayed on the screen such as various other ink, the angle of the gesture, and the like.

Position

Position is another aspect of a gesture. Position may be measured as relative to the display screen and/or relative to another object displayed on the screen such as ink. In some cases, the position of a gesture may be less important than other aspects. In other cases, the position of a gesture may be one of the most important or the defining characteristic of a gesture. For example, if one wanted to select a sentence then delete a word outside of the sentence, a sloppy delete gesture of an X placed between the sentence and the word to be deleted would have different consequences based on the interpretation of how relevant the position of the X was. In one approach, the sentence would be deleted as the action area may encompass the selection and indicates the selection is to be deleted. Alternatively, the fact that the X was not actually on the selection and therefore the position of the X indicates that the intent of the gesture is to delete the word rather than the selection.

Size/Extent

A gesture may have another characteristic based on the size of the gesture. This information permits gestures to have varying impact or extent on what they are modifying. For example, a left bracket may be one line tall or may be multiple lines tall.

With a three line high left bracket, more area is intended to be selected than a two line high left bracket.

In an alternate embodiment, paired gestures (for instance, left and right selection brackets) may not be dependent on size but rather location as the left and right selection brackets may specify a bounding box or the start and stop of a text flow that is to be selected.

Shape

Gesture shapes may be dependent on the area they cover. For example, a left bracket three text lines in height may have a different height/width ratio as a left bracket having a height of only a single text line. Further, some gestures' actual shape content may vary apart from size. For example, a wavy line gesture drawn under text to embolden it or capitalize it may have more humps in the line the longer it is. Accordingly, recognition of a gesture may include normalizing the size of the gesture to a unit area. The recognition may include matching shapes to determine if a single gesture (a wavy line) has been repeated to cover a larger area.

Recognizing Gestures

Figure 4:
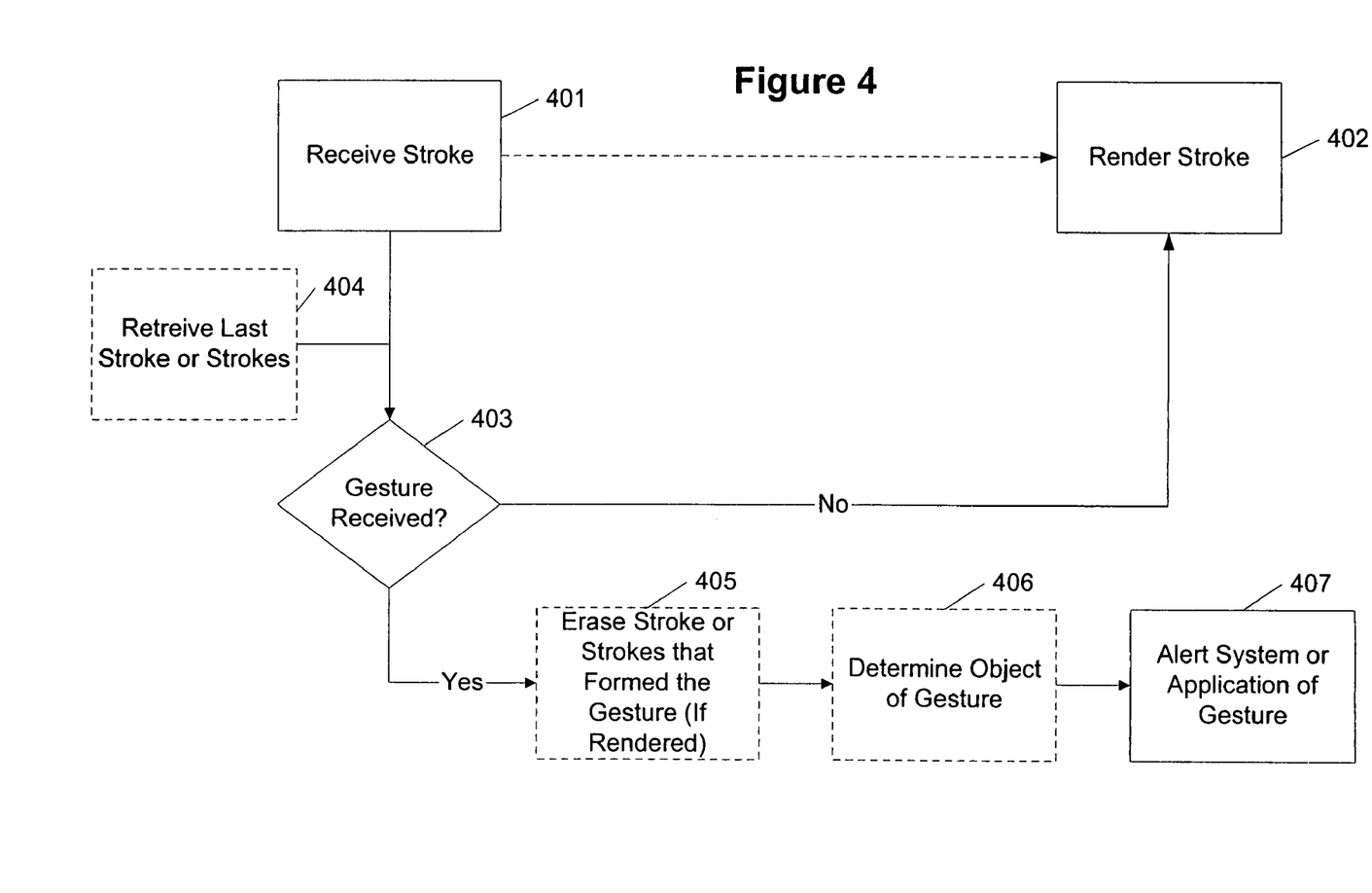
FIGS. 4 and 5 show examples of gesture recognition processes in accordance with embodiments of the present invention.

The more accurately an actual gesture is recognized as a gesture, the better. It is also preferably that ink should not be mistakenly recognized as a gesture. FIG. 4 shows an exemplary process for recognizing certain strokes as gestures and distinguishing them from non-gesture strokes.

In step 401, a stroke is received. In step 403, the system determines whether a gesture was received. This determination may include scaling, reorientation, and/or other operations to determine if a received stroke is a gesture. The system may also look at recent strokes from step 404 as some strokes may be both gestures when taken alone as well as in combination with other strokes. For example, a tap on a paragraph may act as a selection of a word under the tap. Two taps (which means that the system needs to recall the first tap from step 404 in addition to the present tap from step 401) may select a sentence or paragraph that contains the word under the original tap.

If no gesture was received, the stroke received in 401 is rendered in step 402. Alternatively, multiple strokes may be withheld from rendering until they are determined as a group not to be a gesture in step 403, and then collectively rendered in step 402.

If a gesture was received in step 403, the system is alerted to the presence of a gesture. This alert may include the setting of a gesture flag. Alternatively, it may include the sending of the gesture as well as additional information (including one or more of the following: the size of the gesture, the shape of the gesture, the action area of the gesture, and the control method or property). Further, the application in which the stroke was received in step 401 may be alerted to the presence of the gesture (including or not including the additional gesture information).

In alternative embodiments, all strokes may be rendered as soon as received so as to provide immediate feedback to a user. In these embodiments, step 405 may erase the stroke or strokes that formed the gesture.

In yet further embodiments, as shown in step 406, the object associated with the gesture may be determined and provided to the system or the application (of step 407) so as to allow the system or application execute or determine when to execute the gesture. The object may be, e.g., an object displayed on the screen (such as a button, text, graphics, or any other similar displayed object) over which, or near which, the gesture may be drawn. For example, where the gesture is a checkmark, the object may be a button, and the checkmark gesture may cause a particular action to happen in connection with that button. As another example, where the object is a text word, and the gesture is a capital B drawn over the word, the object associated with that capital B gesture would be bolded.

Figure 5:
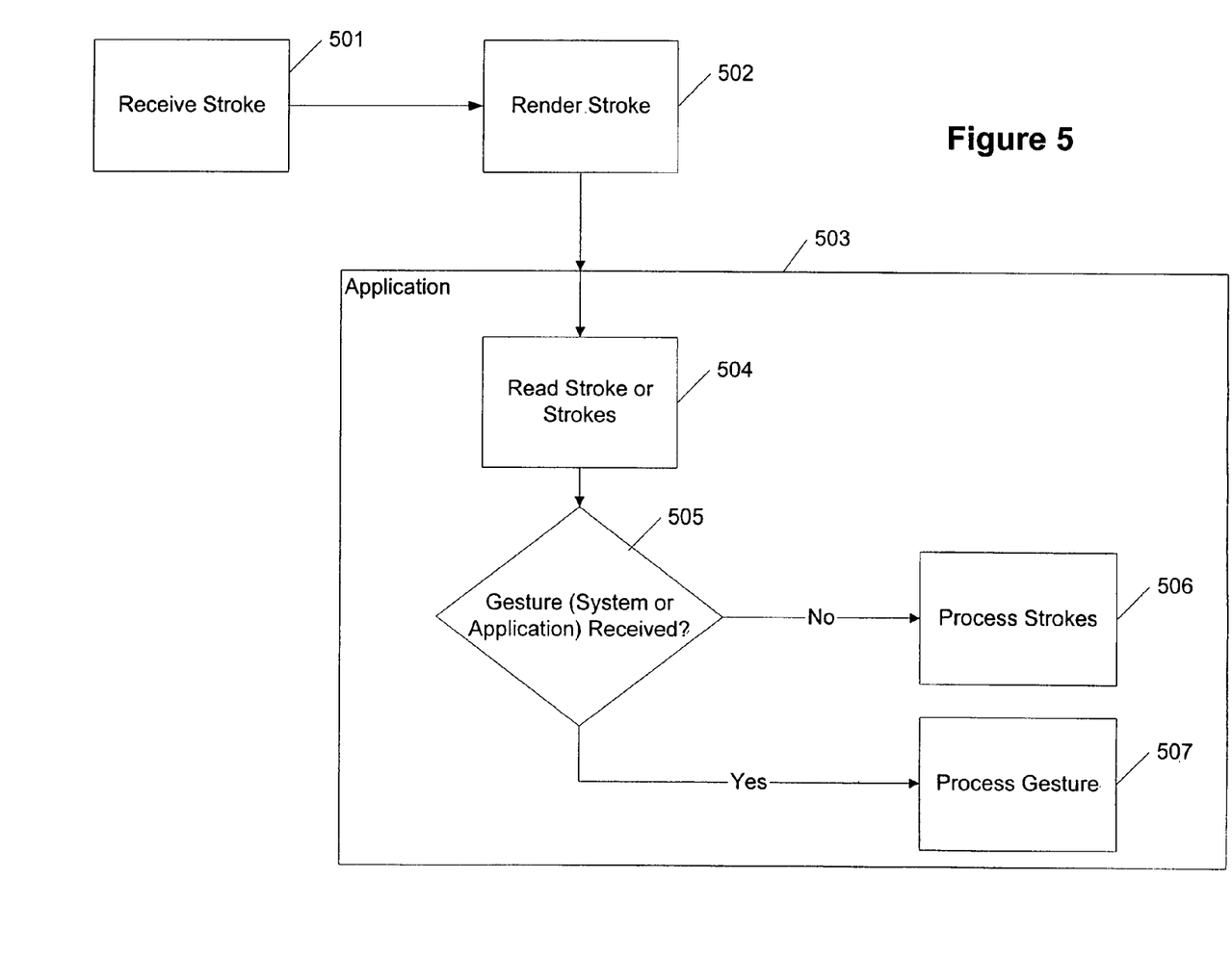

FIG. 4 may provide for the immediate execution of gestures once determined. FIG. 5 shows an alternative embodiment in which strokes are not determined to be gestures by the system but by an application. FIG. 5 provides the option of being to capture strokes at a first time, and then execute the strokes that are gestures at another time. For example, the process of FIG. 5 may be useful for users who like to see all modifications to a document prior to actual execution of the changes.

In step 501, a stroke is received. In step 502, the stroke is rendered and the combination of strokes passed to an application 503. In step 504, the application reads the stroke or strokes. In step 505, the application determines if the receive stroke or strokes are a gesture. This approach may permit the recognition of application-specific gestures, rather than only system-wide gestures.

If, in step 505, it is determined that a gesture was not received, the application processes the strokes 506. If, in step 505, it is determined that a gesture was received, the application processes the gesture in step 507.

Figure 8:
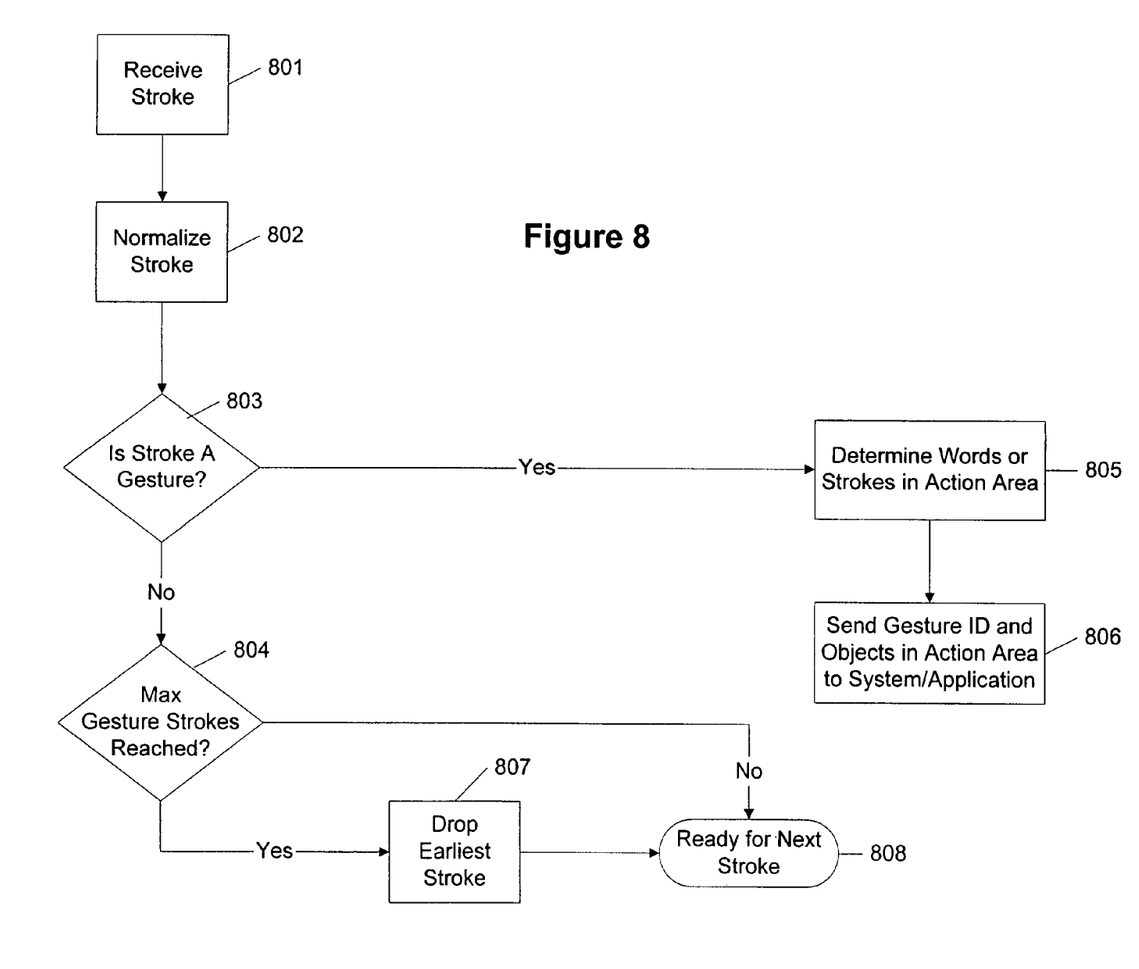
FIG. 8 shows an example of a process used to identify a gesture in accordance with embodiments of the present invention.

FIG. 8 shows another embodiment for recognizing gestures. In step 801, a stroke is received. In step 802, the stroke is normalized. In addition, other steps may be performed in step 802 including any one or more of the following:

1. Collapse the received stroke or strokes into a single point stream with the contact of the pen with the display surface as contacting and not contacting (0 down and 1 up, for example).
2. Scale the X and Y coordinates to a predetermined size (e.g., one inch square) using the physical dimension data from the digitizer. In one embodiment, the scaling information may be discarded. Alternatively, the scaling information may be retained for future use.
3. Scale the time of entry of the points and resample the ink to generate a predetermined number of points (for example, 200). In one embodiment, the time scale information may be discarded. Alternatively, the time scale information may be retained for future use.
4. Additional items including stroke windings, duration of the stroke, aspect ratio of the stroke, maximum distance of any point from a segment connecting endpoints, points of inflection, and the like may be computed.
5. Compute Chebychev polynomials for each of x, y, and z coordinates.
6. Combine some or all of the Chebychev polynomials, the winding, scaling, duration, and scale and input to one or more Bayes net. A separate Bayes net may be used for each gesture.
7. Pass the processed stroke or strokes to each Bayes net and get a score. Any net that exceeds a threshold is recognized. If exactly one net recognizes a gesture, pass that gesture to the application or system. If not, indicate that no gesture was recognized.

Step 803 determines whether a stroke or strokes is a gesture. This may include the matching of step 7 above. If yes, the system determines the words or strokes in the action area 805 and sends the gesture ID and Objects in the action area to the system or application in step 806.

If no, then in step 804, the system determines if a maximum number of strokes have been reached (e.g., four strokes). If no, then the system is ready for the next stroke in step 808. Otherwise, the system drops the earliest received stroke in step 807 then is ready for the next stroke in step 808.

The following lists a variety of exemplary gestures and related methods or properties.

Font property changes—To make a word (or other portion of text) bold, a capital B is drawn on the word or other portion of text. A capital I may be drawn on the word to make the word italics, U for underline, DU for double underline, OV for overline, and N for normal. Other property changes may be realized as well. Some embodiments of gesture recognition may include a determination of the juxtaposition of strokes on one another. Here, the overwriting of a word with a stroke may assist the system or application that a gesture has occurred.

Line breaks—A right down corner may be interpreted as a gesture for a line break, carriage return, new paragraph, and the like. A right up corner may perform the opposite.

Cut/Copy/Paste—An X may be used to cut, a C or a circled X may be used to copy, and a caret to paste. A double caret may be used for a paste special.

Selection—Left and right square brackets may be used to define a selection. Alternatively, a left bracket selects a word by default. In further alternatives, repeated left/right brackets adjust the selection as desired. Arrow gestures can make fine (character-at-a-time) adjustments. Curly braces allow for discontinuous selection.

Text/List/Drawing Grouping—Paragraph gestures made on a selection groups the ink into text and reorganizes the flow of the ink (also referred to as reflow). Alternatively, a section gesture turns it into a drawing or a list. This may also be used in the case of a list (e.g., L gesture).

Gestures may be applied to other applications including internet web pages and spreadsheets. Documents viewed in a browser may be scrolled up and down by the use of a flick in various directions. Multiple flicks may modify how far up and down a page or file is scrolled. In a spreadsheet, vertical braces may define sets of columns. Carets (up or rotated) may be a gesture to insert rows and/or columns.

Figure 6:
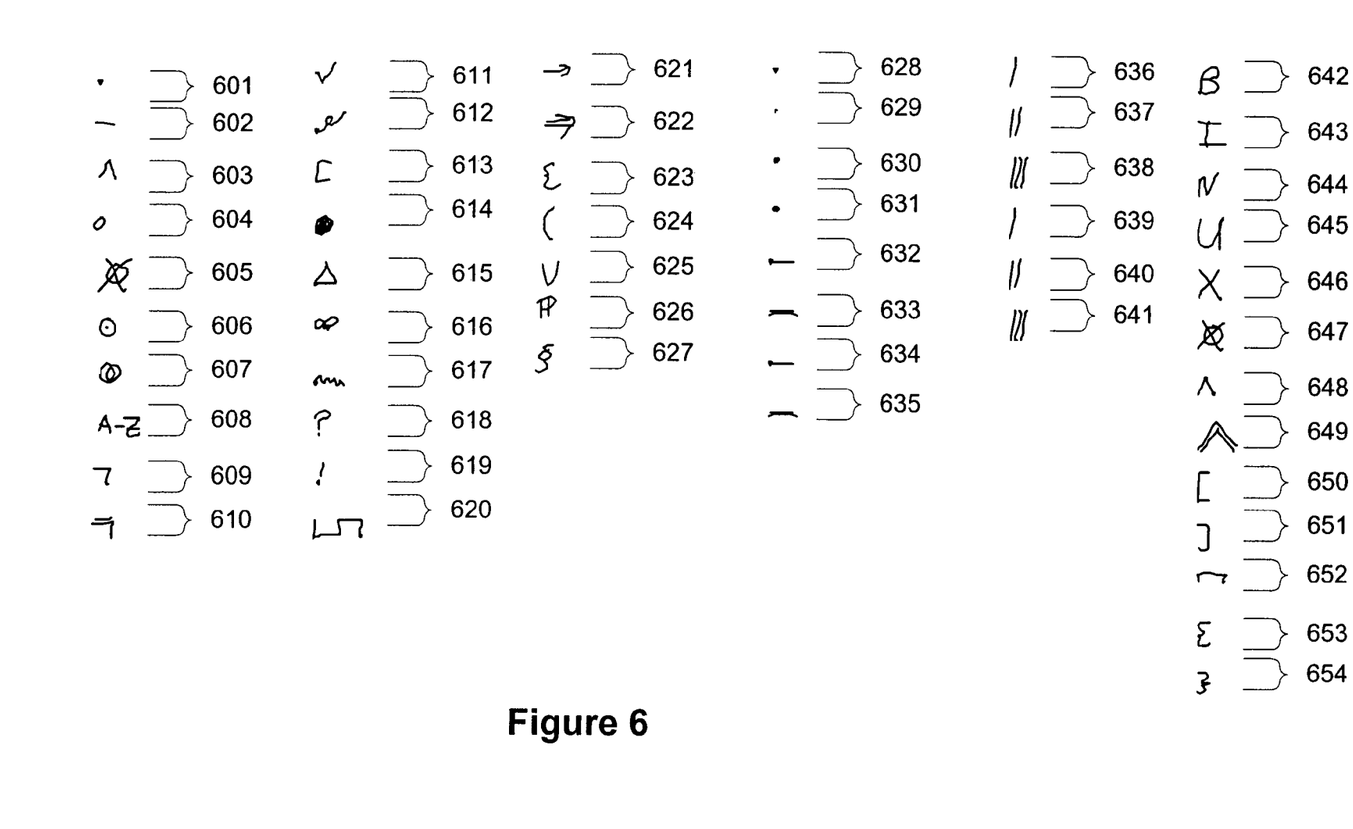
FIG. 6 shows examples of gestures that may be used with embodiments of the present invention.

FIG. 6 shows a variety of different gestures. The following table describes the gestures as well as different variables that may be associated with each. Other glyphs, variations, and semantics may also be used.

| Glyph | Name | Variations (repeat or rotations) | General Semantics |
|---|---|---|---|
| 601 | Tap | 4 | Select |
| 602 | Flick | 16 | Scroll |
| 603 | Chevron | 16 | Insert |
| 604 | Circle | 1 | Select |
| 605 | Circle-Cross | 1 | Undo |
| 606 | Circle-Tap | 1 | |
| 607 | Double Circle | 1 | |
| 608 | Uppercase Latin | 26 | |
| 609 | Corner | 8 | |
| 610 | Flick-Corner | 24 | |
| 611 | Checkmark | 1 | Help |
| 612 | Pigtail | 4 | Delete |

-continued

| Glyph | Name | Variations (repeat or rotations) | General Semantics |
|---|---|---|---|
| 613 | Square Bracket | 4 | Select |
| 614 | Bullet | 2 | |
| 615 | Triangle | 4 | |
| 616 | Infinity | 1 | Clear Selection |
| 617 | Squiggle | 1 | Bold |
| 618 | Question Mark | 1 | Help |
| 619 | Exclamation Mark | 1 | Tool-tip |
| 620 | Swap | 2 | Exchange Strings |
| 621 | Arrow | 4 | Extend Selection |
| 622 | Double Arrow | 4 | |
| 623 | Brace | 4 | Discontinuous Selection |
| 624 | Parenthesis | 4 | |
| 625 | Union | 4 | |
| 626 | Paragraph | 1 | Fill/Justify |
| 627 | Section | 1 | |

The following table lists possible gesture controls.

| Glyph | Name | Operation |
|---|---|---|
| 628 | Tap | Select/Place IP |
| 629 | Double Tap | Select Word |
| 630 | Triple Tap | Select Paragraph |
| 631 | Quadruple Tap | Select All |
| 632 | Right-flick | Scroll left until action area is at right edge of window |
| 633 | Double-Right-Flick | Scroll left to end of document |
| 634 | Left-flick | Scroll right until action area is at left edge of window |
| 635 | Double-Left-Flick | Scroll right to end of document |
| 636 | Up-Flick | Scroll down until action area is at top of screen |
| 637 | Double-Up-Flick | Scroll down to bottom of page |
| 638 | Triple-Up-Flick | Scroll down to bottom of document |
| 639 | Down-Flick | Scroll up until action area is at bottom of screen |
| 640 | Double-Down-Flick | Scroll up to top of page |
| 641 | Triple-Down-Flick | Scroll up to top of document |
| 642 | Latin-Letter-B | Make Target Bold |
| 643 | Latin-Letter-I | Make Target Italic |
| 644 | Latin-Letter-N | Make Target "Normal" |
| 645 | Latin-Letter-U | Make Target Underlined |
| 646 | Latin-Letter-X | Delete Target |
| 647 | Circle-Cross | Copy Target |
| 648 | Up-Chevron | Paste |
| 649 | Double-Up-Chevron | Paste Special |
| 650 | Left-Bracket | Set left edge of selection |
| 651 | Right-Bracket | Set right edge of selection |
| 652 | Top-Bracket | Select column |
| 653 | Left-Brace | Set left edge of discontinuous selection |
| 654 | Right-Brace | Set right edge of discontinuous selection |

Executing Gestures

Execution of a gesture may depend on what an application is supposed to do with a gesture (given the size, shape, and position of the gesture) and how an operating system is to deliver the information relating to the gesture to the application. Some gestures may be interpreted by the operating system and may be passed to an application as one or more mouse and/or keyboard movements. Other gestures may not be recognized by the operating system but rather would only be recognized by an application. Here, the application would need to determine what to do with the gesture based on the various aspects or characteristics of the gesture. Further, gesture interpretation applications may be used to interface non-gesture-enabled applications with operating systems that do not understand a given gesture or gestures at all.

Data Structures

Figure 7:
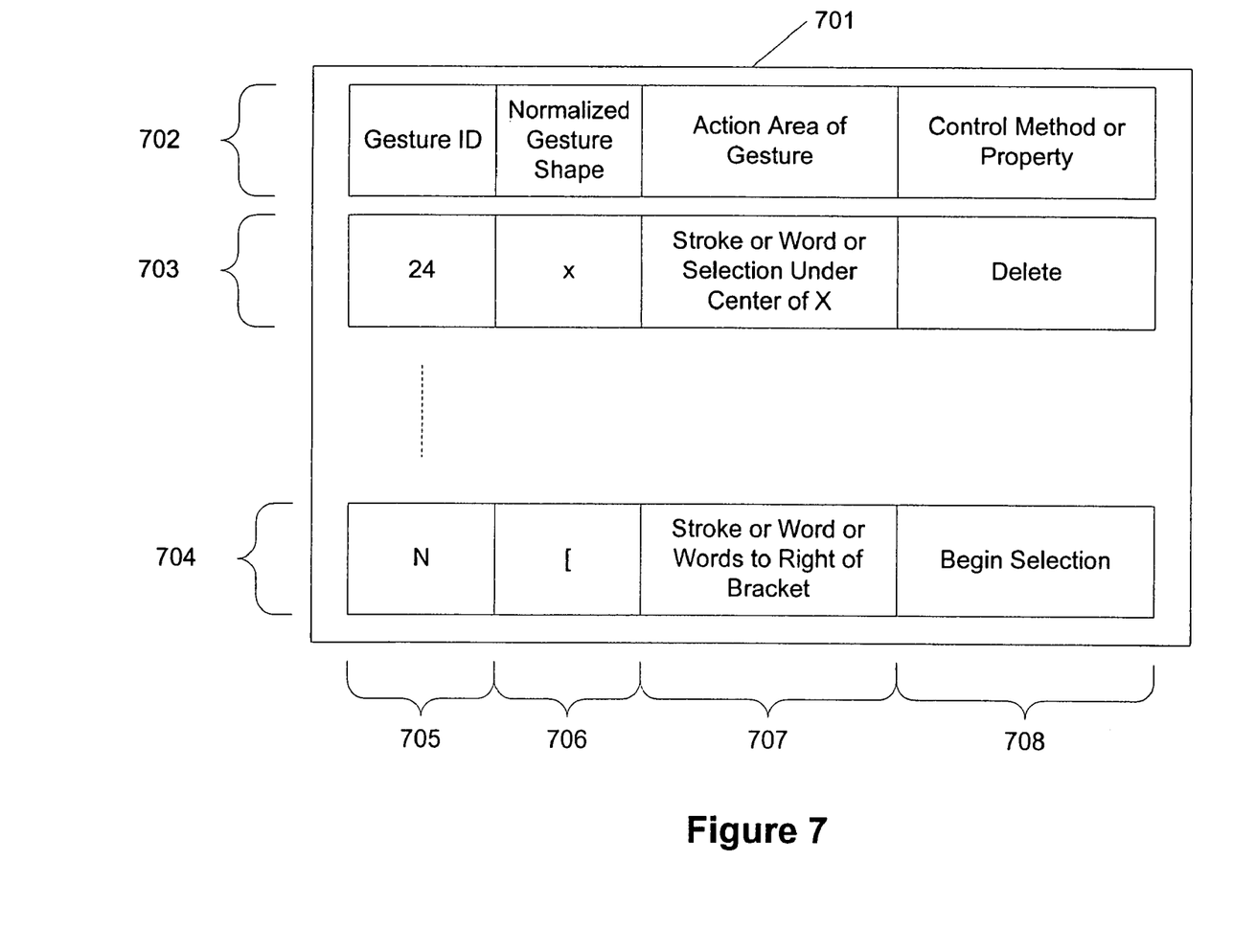
FIG. 7 shows an example of a data structure of a gesture and its associated method or property in accordance with embodiments of the present invention.

FIG. 7 shows an example of one embodiment of a data structure 701 that may be used to represent a gesture. Other data structures may be used as well including arrays, linked lists and the like. Section 702 relates to a generic specification for a gesture. Section 703 relates to a delete gesture. Section 704 relates to a begin selection gesture.

Section 705 includes gesture identification. The gesture identification may be a Unicode character or may be a GUID as are known in the art. Section 706 shows the normalized shape of a gesture. For gesture 703, the normalized shape is an "x". For gesture 704, the normalized shape is a "[". Section 707 includes the action area of the gesture. For gesture 703, the action area is the point located under the crossing of the two lines that make the gesture, for example. For gesture 704, the action area is the stroke, word or words to the right of the bracket.

Section 708 describes the control method or property associated with the gesture. For gesture 703, the associated control method or property is "delete." For gesture 704, the associated control method or property is "begin selection."

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Although the invention has been defined using the appended claims, these claims are exemplary in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations.

We claim:

1. A method for processing strokes, comprising the steps of:

receiving one or more strokes using a stylus of a computing device;

rendering said one or more strokes as ink on a display of said computing device, wherein said display includes at least one other object displaced thereon;

calculating Chebyshev polynomials for one or more coordinate points of said one or more strokes;

passing said polynomials to one or more Bayes nets, said Bayes nets corresponding to one or more predetermined command gestures, said command gestures being associated with one or more commands to alter the appearance of a displaced object;

if the polynomials correspond to one or more of said Bayes nets, causing said computing device to execute said one or more commands associated with said predetermined command gestures to alter an appearance of said at least one other object, and to delete said ink; and if the polynomials do not correspond to one or more of said Bayes nets, allowing the rendered ink to remain on the display;

wherein said predetermined command gesture is in the shape of one or more text characters on top of an existing portion of text displayed on said display, and wherein said altering an appearance changes an appearance of the portion of text.

2. The method of claim 1, wherein said ink is in the form of textual characters.

3. The method of claim 1, wherein one or more of said Bayes nets corresponds to in-the-air command gestures made while a tip of said stylus is not touching said display.

4. The method of claim 3, wherein said in-the-air command gestures are made by varying an altitude of said stylus above said display.

5. The method of claim 4, wherein said gestures are made using a dedicated input portion of said display.

6. The method of claim 5, wherein said dedicated input portion of said display is temporary.

7. The method of claim 1, further comprising the step of normalizing data corresponding to said one or more strokes, and wherein said step of calculating Chebyshev polynomials uses said normalized data.

8. The method of claim 1, further including the step of dropping an earliest received stroke if a maximum number of non-corresponding strokes have been reached.

9. One or more computer-readable media storing computer-executable instructions for processing strokes using the following steps:
receiving one or more strokes using a stylus of a computing device;
rendering said one or more strokes as ink on a display of said computing device, wherein said display includes at least one other object displaced thereon;
calculating Chebyshev polynomials for one or more coordinate points of said one or more strokes;
passing said polynomials to one or more Bayes nets, said Bayes nets corresponding to one or more predetermined command gestures, said command gestures being associated with one or more commands to alter the appearance of a displaced object;
if the polynomials correspond to one or more of said Bayes nets, causing said computing device to execute said one or more commands associated with said predetermined command gestures to alter an appearance of said at least one other object, and to delete said ink; and
if the polynomials do not correspond to one or more of said Bayes nets, allowing the rendered ink to remain on the display;
wherein said predetermined command gesture is in the shape of one or more text characters on top of an existing portion of text displayed on said display, and wherein said altering an appearance changes an appearance of the portion of text.

10. The one or more computer-readable media of claim 9, wherein said ink is in the form of textual characters.

11. The one or more computer-readable media of claim 9, wherein one or more of said Bayes nets corresponds to in-the-air command gestures made while a tip of said stylus is not touching said display.

12. The one or more computer-readable media of claim 11, wherein said in-the-air command gestures are made by varying an altitude of said stylus above said display.

13. The one or more computer-readable media of claim 12, wherein said gestures are made using a dedicated input portion of said display.

14. The one or more computer-readable media of claim 13, wherein said dedicated input portion of said display is temporary.

15. The one or more computer-readable media of claim 9, further including instructions for normalizing data corresponding to said one or more strokes, and wherein said calculating Chebyshev polynomials uses said normalized data.

16. The one or more computer-readable media of claim 9, further including instructions for dropping an earliest received stroke if a maximum number of non-corresponding strokes have been reached.

17. The one or more computer-readable media of claim 9, further including instructions for using a positional relationship between a location of a received command gesture and a location of pre-existing ink rendered on the display before receiving the command gesture to identify a corresponding command.

18. The one or more computer-readable media of claim 9, further comprising instructions to cause strokes made over words on a display to be interpreted as gestures with associated commands.

* * * * *